March 17, 1964  L. R. McROBERT  3,125,097
ROOT CROP HARVESTER HAVING A SPECIFIC CROP SEPARATING MEANS
Filed Feb. 9, 1960  4 Sheets-Sheet 2
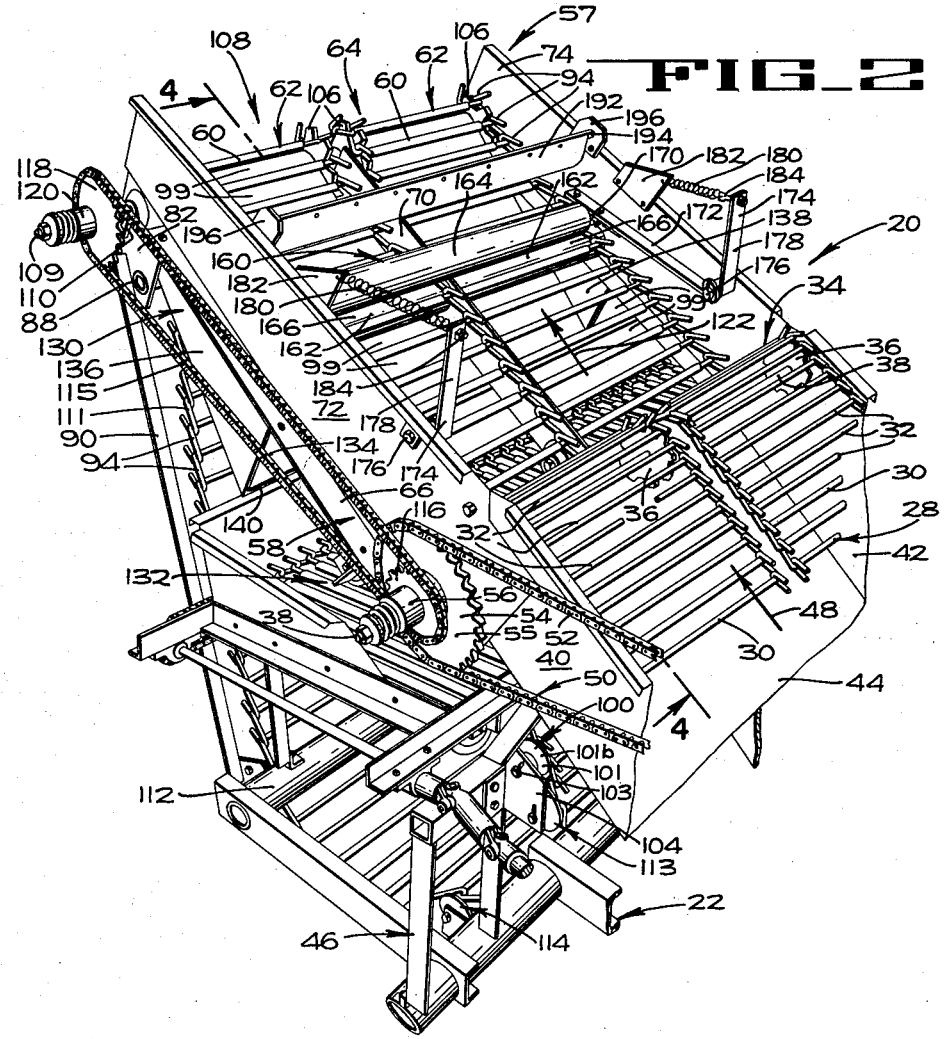
FIG_2
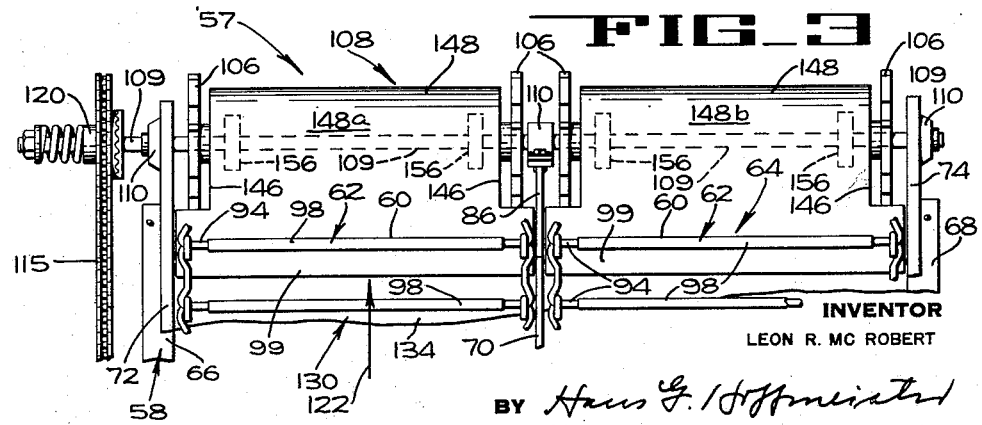
FIG_3
INVENTOR
LEON R. MC ROBERT
BY *Hans G. Hoffmeister*
ATTORNEY March 17, 1964 L. R. McROBERT 3,125,097
ROOT CROP HARVESTER HAVING A SPECIFIC CROP SEPARATING MEANS
Filed Feb. 9, 1960 4 Sheets-Sheet 3
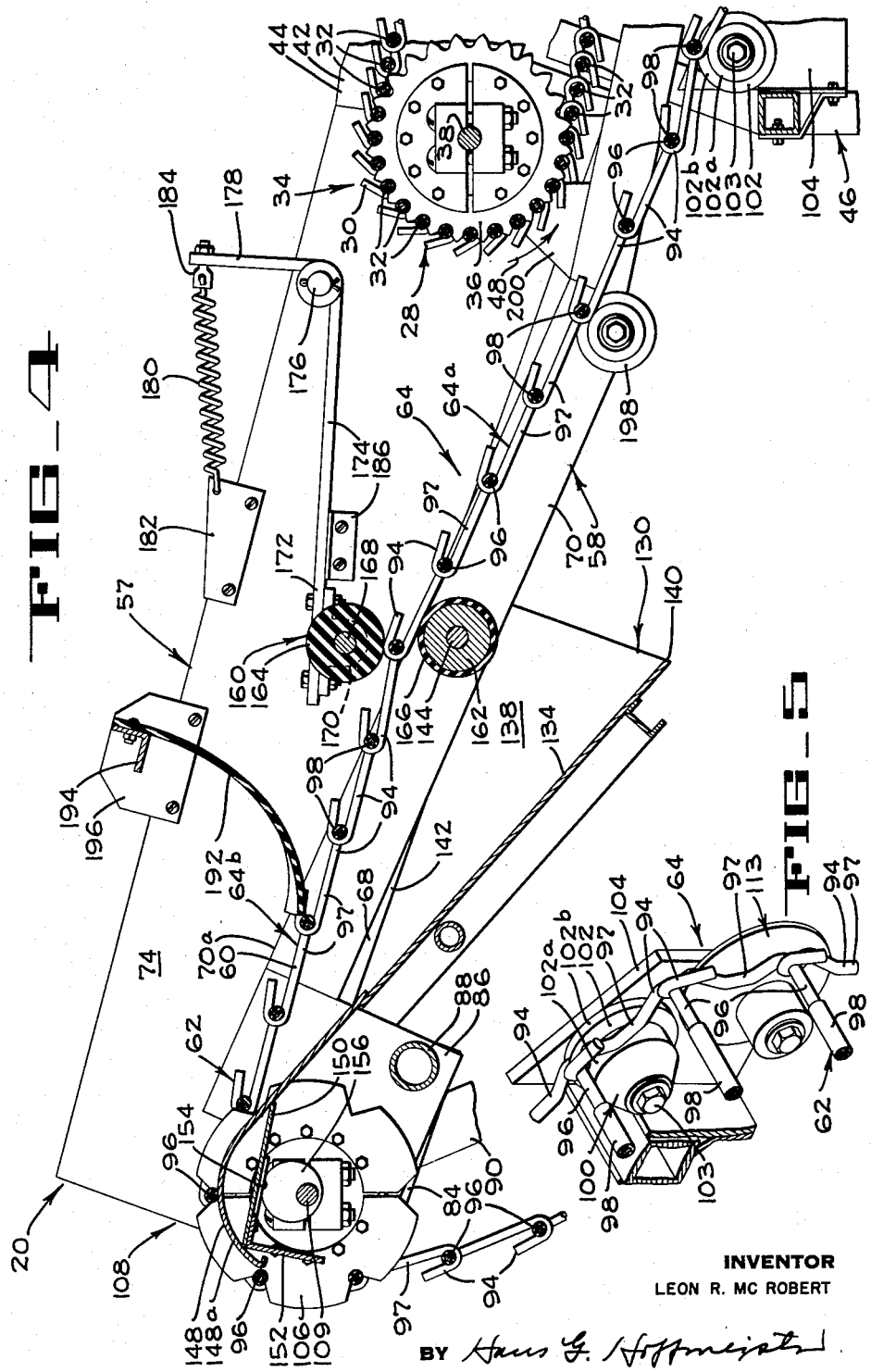
INVENTOR
LEON R. MC ROBERT
BY
ATTORNEY March 17, 1964   L. R. McROBERT   3,125,097
ROOT CROP HARVESTER HAVING A SPECIFIC CROP SEPARATING MEANS
Filed Feb. 9, 1960   4 Sheets-Sheet 4
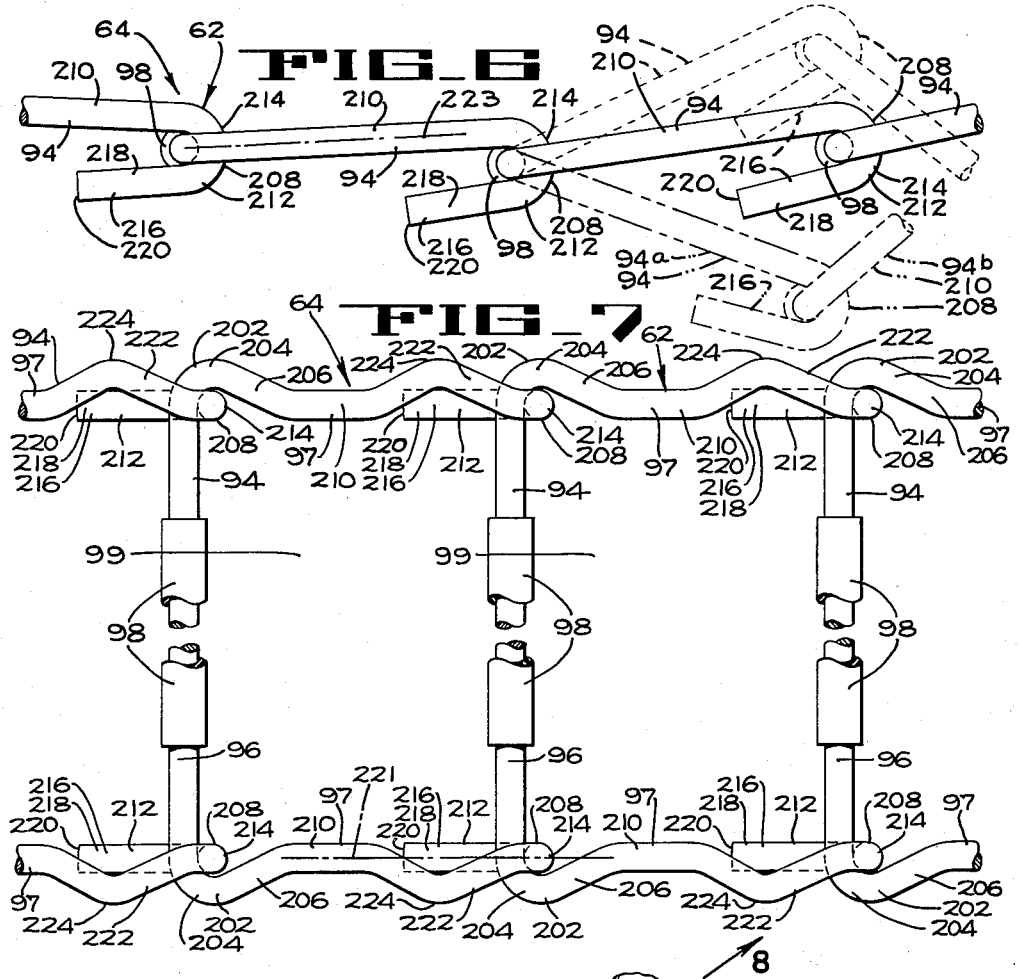
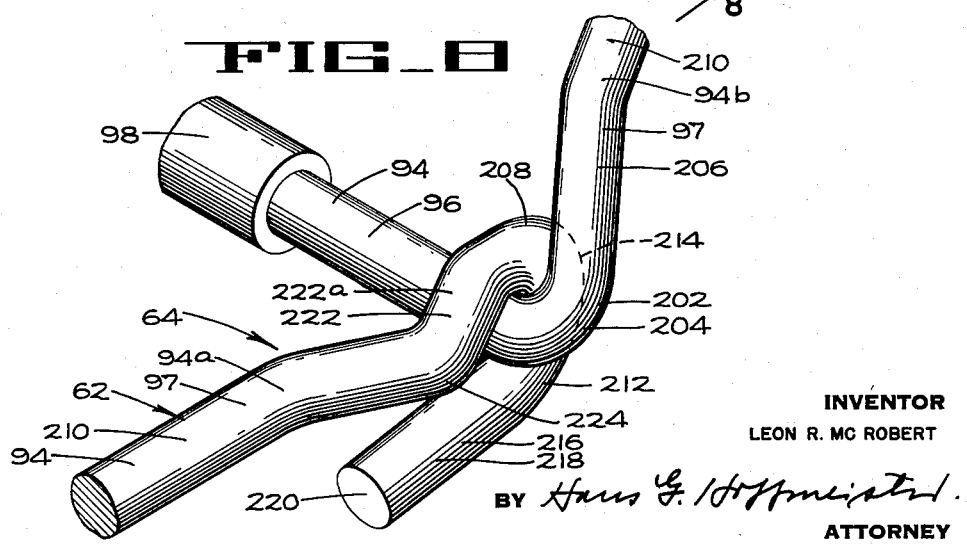
INVENTOR
LEON R. MC ROBERT
BY
ATTORNEY

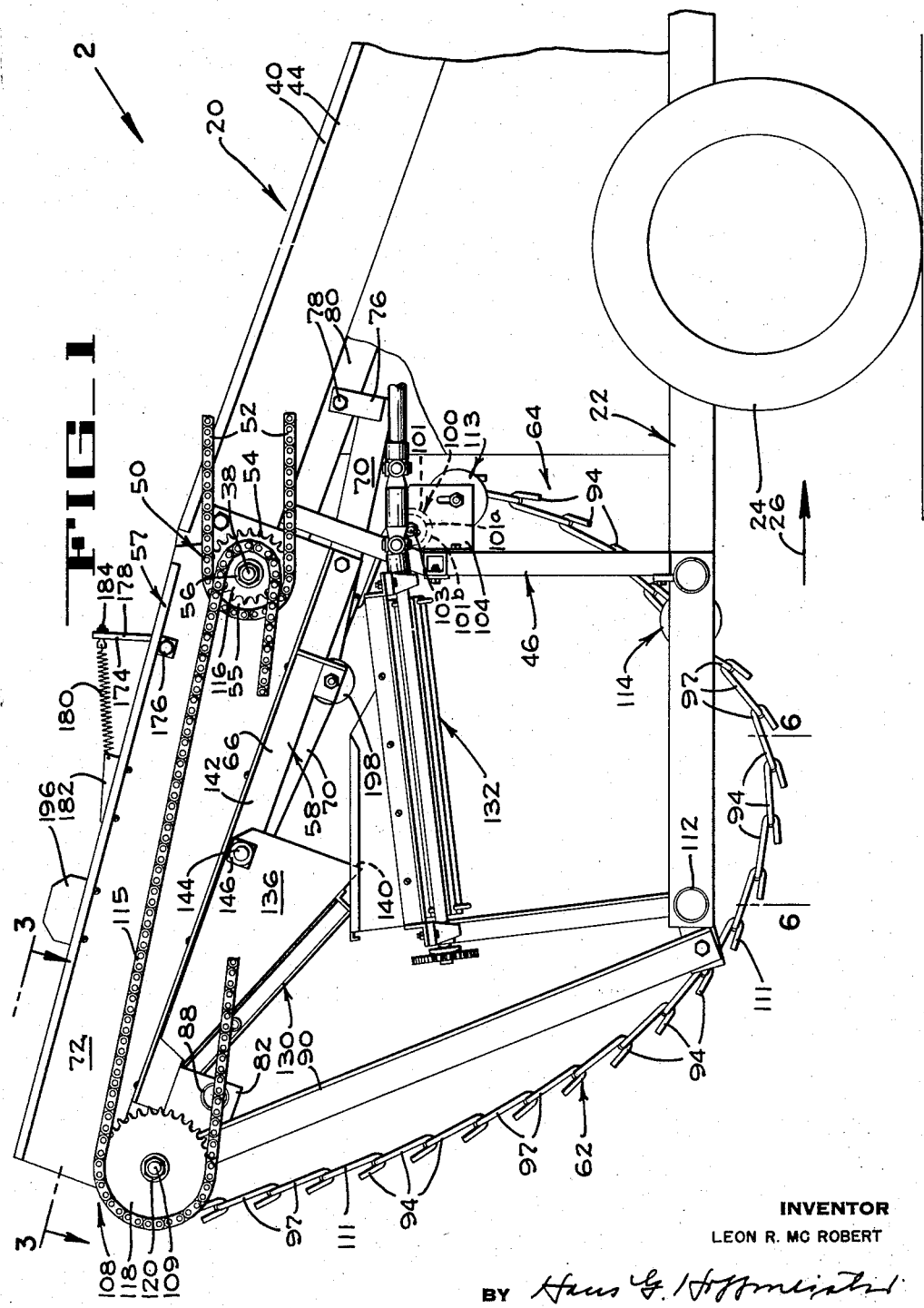

United States Patent Office 3,125,097
Patented Mar. 17, 1964

3,125,097
ROOT CROP HARVESTER HAVING A SPECIFIC CROP SEPARATING MEANS
Leon R. McRobert, Williamston, Mich., assignor to FMC Corporation, a corporation of Delaware
Filed Feb. 9, 1960, Ser. No. 7,645
4 Claims. (Cl. 130—30)

The present invention appertains to machines for harvesting a root crop such as potatoes and relates more particularly to apparatus in a harvesting machine for separating the plant tops and roots from the potatoes.

Although the apparatus of the present invention will be described in the specification and referred to in the claims as used in harvesting potatoes it is to be particularly understood that it can be successfully employed in harvesting any of several different root crops or crops of a closely related character.

An object of the present invention is to provide an improved potato harvester.

Another object is to provide improved means in a potato harvester for separating the potatoes from the plant tops and roots.

Another object is to provide improved means for discharging potatoes from apparatus for separating potatoes from their plant tops and roots.

These and other objects and advantages of the present invention will become apparent from the following description and the accompanying drawings, in which:

FIG. 1 is a fragmentary side elevation of a potato harvester to which the apparatus of the present invention is operatively attached.

FIG. 2 is a reduced perspective of the structure shown in FIG. 1, partly broken away and viewed from the near side in the direction indicated by the arrow 2 thereof.

FIG. 3 is a fragmentary plan of the apparatus of the present invention partly broken away and taken along lines 3—3 of FIG. 1.

FIG. 4 is an enlarged vertical section taken along lines 4—4 of FIG. 2.

FIG. 5 is an enlarged perspective showing a portion of the conveyor chain mounting structure in the apparatus of the present invention.

FIG. 6 is an enlarged side elevation of the portion of the conveyor chain included between lines 6—6 of FIG. 1.

FIG. 7 is a plan, partly broken away, of the conveyor chain shown in FIG. 6.

FIG. 8 is an enlarged fragmentary perspective showing the connection between two links at one side of the conveyor chain shown in FIGS. 6 and 7 with the links in different positions and viewed from above in the direction indicated by the arrow 8 in FIG. 7.

The potato harvester 20 comprises a chassis 22 (FIGS. 1 and 2) having transport wheels 24 (only one shown, FIG. 1). The harvester 20 is moved along the rows of potato plants (not shown) on the wheels 24 in the direction indicated by the arrow 26 by any well known means, and digs the potato plants in two adjoining rows, by means not shown. The potatoes, their plant tops and roots along with some clods, loose earth and rocks are delivered onto a conveyor 28, only part of which is shown (FIG. 2).

The conveyor 28 is upwardly and rearwardly inclined and includes two similar, endless conveyor chains 30 (FIG. 2) in side by side relation, each having a plurality of equally spaced, transverse flights 32 (FIGS. 2 and 4). At the upper or discharge end 34 of the conveyor 28 the chains 30 are trained about a plurality of sprockets 36 fixed to a drive shaft 38 and at the lower end the chains are trained about idler sprockets or rollers, not shown. The drive shaft 38 is journaled in opposite, vertical side walls 40 and 42 (FIG. 2) of a conveyor housing 44 which is channel-shaped in cross section and is secured to the chassis 22. The upper end 34 of the conveyor 28 is supported at a suitable height by a generally upright frame 46 (FIGS. 1, 2 and 4) which extends between and is secured to the chassis 22 and to the housing 44.

The conveyor 28 is driven in the direction indicated by the arrow 48 (FIGS. 2 and 4) by a chain and sprocket drive 50. A chain 52 of the drive 50 is connected to a source of suitable power (not shown) on the harvester 20 and is trained about a sprocket 54 of a double sprocket 55 (FIGS. 1 and 2) which is freely rotatable on the drive shaft 38. A spring biased, overload clutch 56 releasably connects the double sprocket 55 in driving engagement with the shaft 38 to drive the same by means of the chain 52.

As the potatoes, the plant tops and the roots are carried upward by the conveyor 28, many clods and stones and much of the loose earth falls between the closely spaced flights 32 back to the ground while the vine-like plant tops and roots, hereinafter called "trash," and the potatoes remain on the conveyor 28. The potatoes and trash are discharged from the conveyor 28 at the end 34 thereof onto the apparatus of the present invention, hereinafter called the trash eliminator 57, which efficiently separates the trash from the potatoes.

The trash eliminator 57 comprises a generally rectangular frame 58 (FIG. 1) by which oblique runs 60 of two side-by-side endless chains 62 (FIG. 2) are operatively supported. The oblique runs 60 provide an elongate extension (FIG. 4) of the conveyor 28 and will hereinafter be referred to as trash eliminator conveyor 64. The rectangular frame 58 comprises two opposite angle bars 66 (FIG. 1) and 68 (FIG. 4) extending longitudinally of the conveyor 64, and a central, longitudinally extending bar 70 (FIGS. 2 and 4) located midway between the angle bars 66 and 68. The angle bars 66 and 68 have elongate, upstanding walls 72 and 74, respectively, fixed thereto which are secured adjacent the front end of the frame 58 to the side walls 40 and 42, respectively, and provide aligned extensions thereof. As seen in FIG. 1, the adjacent end portion of the central bar 70 extends beneath the housing 44 and has an upstanding bracket 76 bolted at 78 to a reinforcing bar 80 extending longitudinally of and secured to the housing 44. The ends of the angle bars 66 and 68 and the bar 70 at the inner or front of the conveyor 64 are thus held in laterally spaced relation at equal intervals. Vertical plates 82, 84 and 86 (FIGS. 1 and 4), fixed to and projecting downward from the angle bars 66 and 68 and the bar 70, respectively, at the outer or rear end of the frame 58, are secured to a transverse beam 88 which cooperates with the housing 44 to retain these bars in parallel relation. Opposite support legs 90, fixed to and extending between the plates 82 and 86, respectively, and the chassis 22 hold the rear end of the frame 58 at a suitable height above the discharge end 34 of the conveyor 28. The upwardly inclined frame 58 supports the conveyor 64 in a manner to be more fully explained, with the side walls 72 and 74 in fixed positions at opposite sides thereof.

The two endless chains 62 of the trash eliminator conveyor 64 each comprises a series of interlocked links 94 of corresponding construction. Each link 94 (FIG. 7) is of U-shaped configuration and includes a bight portion 96 from which opposite legs 97 project. The bight portions 96 have resilient coverings 98 of material such as rubber and are equally spaced throughout the chains 62. The adjacent bights 96, which extend the full width of the chains function as transversely extending flights and are spaced apart to provide openings 99 therebetween of a size permitting the largest potatoes to pass easily through the chains 62.

As seen in FIG. 2, the chains 62 of the conveyor 64 are located at opposite sides of the bar 70 and each chain 62 is trained about a pair 100 of idler rollers 101 (FIGS. 1 and 2) and 102 (FIGS. 4 and 5) which support the chains 62, adjacent the front end of the trash eliminator conveyor 64, and hold them in spaced relation beneath the associated chain 30 at the discharge end 34 of the conveyor 28. The rollers 101 and 102 are relatively short and are rotatably mounted on axially aligned stud bolts 103 which are secured to opposite brackets 104 (FIGS. 1 and 4) fixed to the frame 46. The rollers 101 and 102 have cylindrical body portions 101a (FIG. 1) and 102a (FIG. 5) which are engaged by the legs 97 of the chains to support the same for longitudinal movement. Flanges 101b and 102b at the outer ends of the roller bodies 101a and 102a engage the lateral sides of the chains (FIG. 5) and hold the chains 62 against lateral shifting.

At the rear or discharge end 108 of the conveyor 64, the chains 62 are each trained about a pair of axially spaced drive sprockets 106 (FIGS. 2, 3 and 4). The sprockets 106 of each pair engage the flights 96 of the associated chain 62 adjacent the legs 97 and are secured to a common transverse drive shaft 109. The shaft 109 is journaled in bearings 110 (FIG. 3) fixed to the sides of the plates 82 and 84 and to the rear edge of the plate 86. The lower runs 111 of the chains 62 below the frame 58 (FIG. 1) drape loosely between the sprockets 106 and the idler rollers 101 and 102 and pass beneath a transverse beam 112 of the chassis 22. Another pair 113 (FIGS. 1 and 5) of idler rollers is mounted on the brackets 104 and another pair 114 (only one shown, FIGS. 1 and 2) is mounted on the chassis 22. The individual rollers of the pairs 113 and 114 are similar to the rollers 101 and 102 of the pair 100 and support and guide the chains in the draped runs 111.

A drive chain 115 (FIG. 2) trained about a sprocket 116 of the double sprocket 55, and about a sprocket 118 drivingly connected to the shaft 109 by a spring biased, overload clutch 120 drives the conveyor 64 in the direction indicated by the arrow 122 when the drive 50 is operating.

The present trash eliminator 57 employs a rapidly oscillating or vibrating chute 130 (FIGS. 1 and 4) located beneath the discharge end 108 of the trash eliminator conveyor 64 to direct potatoes, passing through the openings 99 between the flights 96 in this region, onto a takeaway conveyor 132 (FIG. 2) extending transversely to the conveyor 64. Known trash eliminators employed on potato harvesters have fixed chutes for this purpose. The moist earth and debris, such as broken and crushed plant stems and leaves, falling onto a fixed chute easily adhere to the same and quickly build up to a point where the effectiveness of such a chute is seriously impaired. This problem has been solved by the vibrating chute 130 of the present invention in a manner to be disclosed.

The chute 130 comprises a generally planar floor 134 (FIG. 4) extending transversely of the conveyor 64. The floor 134 has upstanding, triangular-shaped side walls 136 and 138 (FIGS. 1 and 4) at its opposite side edges extending along the same from the lower, transverse edge 140 of the chute 130. The upper edge portions of the side walls 136 and 138 are disposed beside the outer surfaces of opposite vertical legs 142 (FIGS. 1 and 4) of the angle bars 66 and 68. The corner portions of the walls 136 and 138, which are disposed generally vertically above the edge 140 (FIGS. 1 and 4), are rotatably received on the ends of a transverse shaft 144 extending through the legs 142 and through the center bar 70. Set collars 146 (only one shown, FIG. 1) are fixed to the ends of the shaft 144 to prevent axial movement thereof and accidental removal of the chute 130 therefrom.

The upper end portion of the chute floor 134 is cut away at opposite edges and in the center as indicated by the numeral 146 (FIG. 3) to provide clearance for the sprockets 106. The upper, rear portion of the floor 134 is downwardly curved (FIG. 4) over the drive shaft 109 and is disposed beneath the chains 62 to provide a lip 148 of cylindrical configuration having right and left hand portions 148a and 148b (FIG. 3). A plate 150 (FIG. 4), extending transversely of the chute 130, is fixed to the underside of each lip portion 148a and 148b and supports a depending shield 152 to partially enclose the shaft 109. Two wear strips 154 (only one shown, in FIG. 4), which function as cam followers are secured to the under surface of each plate 150 and engage associated eccentric cam discs 156 (FIGS. 3 and 4) fixed to the drive shaft 110. The cam followers 154 are retained by the weight of the chute 130 in engagement with the cams 156 which swing the chute 130 up and down about the shaft 144 during operation of the conveyor 64.

A potato retarding device 160, associated with the trash eliminator conveyor 64 (FIGS. 2 and 4), comprises two axially aligned, lower rollers 162 and an upper roller 164 of the same diameter. The lower rollers 162 are of corresponding construction and are freely rotatable on the chute mounting shaft 144 at opposite sides of the central bar 70. Each roller 162 extends from the bar 70 to the associated side bar 66 or 68 as the case may be, and is provided with a resilient outer layer 166 of material such as rubber. It is apparent (FIG. 4) that the legs 97 of the links of chains 62 ride upon the rollers 162 which support a transverse portion of the conveyor 64, adjacent the longitudinal center thereof at a level above a plane defined by the axes of the shaft 109 and the idler rollers 101 and 102. In this way opposite conveyor portions 64a and 64b are provided, which are angled away from the rollers 162 toward the idler rollers 101 and 102 and the sprockets 106, respectively. For this reason, potato plants on the conveyor portion 64b are less apt to twine about the roller 162.

The upper roller 164 of the potato retarding device 160 is composed of resilient material such as rubber secured to a shaft 168. The roller 164 extends across the conveyor 64, substantially directly above the rollers 162, and the ends of the shaft 168 are journaled in bearings 170 (only one shown, FIGS. 2 and 4). Each bearing 170 is secured to one arm 172 of each of two corresponding bellcranks 174 (FIGS. 1, 2 and 4).

Each bellcrank 174 is pivotally mounted on one of two stub shafts 176 at the juncture of the arm 172 and a shorter, upstanding arm 178. The stub shafts 176 (FIGS. 1, 2 and 4) are axially aligned transversely of the conveyor 64 and are secured to the walls 72 and 74, respectively. A spring 180, associated with each bellcrank is connected at one end by a bracket 182 to one of the walls 72 or 74 and at its other end to the arm 178 by an eye bolt 184. The eye bolts 184 can be adjusted in a well known manner to vary the tension on the springs 180 and consequently the force with which the upper roller 164 is urged downward (FIGS. 2 and 4). Abutment stops 186 (only one shown, FIG. 4), secured to the walls 72 and 74, are engaged by the arms 172 of the bellcranks 174 under the urgency of the springs 180 to limit downward movement of the roller 164. The stops 186 prevent the roller 164 from coming any closer to the rollers 162 than to a location to substantially clear the links 94 of the chains 62 traversing the rollers 162.

A hold down flap 192 (FIGS. 2 and 4), fashioned of relatively thin, flexible material such as rubber impregnated, fabric belting, is located downstream from the potato retarding device 160. The flap 192 extends across the conveyor and is hung from a cross beam 194 having opposite end plates 196 which are secured to the side walls 72 and 74 to hold the beam 194 suitably spaced above the conveyor 64. The flap 192 is draped loosely upon the conveyor 64 (FIG. 4) and holds the roots and vine-like plant tops (not shown) down against the conveyor 64. The plant tops and roots are accordingly prevented from falling back and twining about the roller 164, which would impair its effectiveness.

During operation of the harvester 20, potatoes along with the trash and perhaps some rocks and clods which are too large to fall between the flights 32 of the conveyor 28 are delivered thereby onto the trash eliminator 57. A pair of axially aligned idler rollers 198 (FIGS. 1 and 4), similar to the rollers of the pairs 100, 113 and 114, are mounted on the frame 58 below the discharge end 34 of the conveyor 28 and provide additional support for the conveyor portion 64a. A blade 200 (FIG. 4), secured to the bar 70 and projecting obliquely forward and upward toward the conveyor 28 between the center sprockets 36 thereof, is arranged to dislodge rocks and clods which have been caught between the center sprockets 36.

It will be apparent that some of the potatoes are separated from their plants prior to their arrival on the trash eliminator 57. Upon delivery to the trash eliminator 57, these loose potatoes, as well as the clods and stones mentioned previously, fall through the openings 99 in the conveyor 64 and onto the take-away conveyor 132 which is mounted below the trash eliminator 57 on the chassis 22 (FIGS. 1 and 2). The conveyor 132 is driven in any well known manner to deliver the potatoes, clods and stones thereon to one side of the harvester 20 for a subsequent sorting operation.

The potatoes, which are still securely attached to the plant tops, continue to move therewith toward the potato retarding device 160 (FIGS. 2 and 4). Some of these potatoes fall through the openings 99 and are suspended below the conveyor 64 by their plant tops which remain on the conveyor. These potatoes are carried by the advancing plant tops into engagement with one or the other of the lower rollers 162. Under such a condition, the rollers 162 stops advance of these potatoes and the following chain flight 96 pulls the plant tops to which the potatoes are attached across the roller 162. In so doing these potatoes are freed or detached from their plant tops and fall to the take-away conveyor 132. The resilient coverings 98 and 166 on the flights 96 and the rollers 162, respectively, protect these potatoes from bruising by either the flights 96 or the rollers 162 during the particular action described.

Some potatoes, which are still attached to their plants lie in on upon the advancing mass of trash moving toward the potato retarding device 160. These potatoes usually have a minimum dimension which is greater than the normal spacing between the lower and upper rollers 162 and 164 shown in FIG. 4. As these potatoes are carried with the advancing trash by the conveyor 64 into engagement with and between the rollers 162 and 164, they are retarded thereby in their advance with respect to the conveyor 64. Since the plant tops are not retarded by the rollers 162 and 164 they are torn free or detached from the potatoes. The roller 164 is permitted by the springs 180 to yield upward thus enabling even the largest potatoes to eventually pass unharmed between the rollers 162 and 164. Since the rollers 162 and 164 are covered by or are made of resilient material they are not apt to bruise the potatoes during the retarding operation. These potatoes, after being detached from their plants, pass the retarding device 160 and fall through the openings 99 in the conveyor 64 and into the chute 130 which guides them onto the take-away conveyor 132.

It is to be understood that the stems of the potato plants on the trash eliminator are crisp and filled with juices and that considerable earth clings to the roots of the potato plants. The plants are inevitably bruised and crushed to some extent and earth is loosened from the roots as the plants, carried by the conveyor 64, pass between the rollers 162 and 164. The juices and the earth mix and fall to the chute floor 134 along with certain plant fragments. Since this material, hereinafter called debris, is wet, it has a muddy consistency and a natural tendency to adhere to the floor 134. It is apparent that, unless prevented, this debris will soon build up on the chute floor 134 and seriously impair the chute's effectiveness. For this reason, the chute 130 of the present invention is vibrated rapidly by the cams 156 during operation of the conveyor 64. Due to the location of the axis about which the chute 130 pivots and the location of the cams 156 with respect thereto, the amplitude of this vibration imparted to each part of the chute is proportional to the distance the part is from the discharge end of the chute. Therefore, the farther the debris has to travel on the chute the harder the chute is vibrated to prevent its adherence to the chute. Because of this rapid vibration the chute 130 quickly sheds the debris thus preventing any build-up thereof on the floor 134.

After passing the retarding device 160, the trash passes beneath the hold down flap 192 which acts as a gate and prevents the plant stems that have passed the flap from falling back and twining about the upper roller 164.

As shown best in FIG. 4, the rear portion 70a of the center bar 70 including the plate 86 are upwardly inclined with respect to the conveyor portion 64b from the lower rollers 162 to approximately the height of the top of the sprockets 106. Any clods or stones that may be caught between the chains 62 of the conveyor 64 are raised by the bar portions 70a to easily pass over the center sprockets 106 (FIG. 3) rather than be caught therebetween.

Adjacent the discharge end 108 the trash is carried by the conveyor 64 over the cylindrical lip 148 of the chute floor 134 and falls to the ground at the rear of the harvester 20. The shield 152 prevents any trash from twining around the drive shaft 109 and cams 156 and impairing the operation thereof.

The draped runs 111 of the chains 62 (FIG. 1), are free to swing about and, during operation of the harvester 20, are violently shaken. Under such a condition the links of conventional chains heretofore used in harvesters of the type concerned frequently become disconnected when two interconnected links pivot toward each other as illustrated in dot-dash lines (FIG. 6). The chain 62 of the present invention overcomes this problem and accordingly is particularly adapted for use in the trash eliminator 57.

In FIGS. 6 and 7 a portion of the lower run of the chain 62 is shown. It will be seen that the links 94 of the chain 62 are of corresponding U-shaped configuration and are each formed from a bar having a circular cross section. The opposite legs 97 of each link project generally at right angles to the associated bight 96 and project in leading relation with respect thereto in the chain 62 (FIG. 1). The juncture 202 between the bight portion 96 and each leg 97 (FIG. 7) includes a rounded portion 204 adjoining the bight 96 and a straight, inclined portion 206. The inclined portion 206 extends inwardly of the link from the round portion 204 toward the longitudinal centerline of the chain. A central portion 210 of each leg 97 extends toward the leading end 208 thereof from the inclined portion 206 at substantially a right angle to the associated bight portion 96. In this way the central portions 210 of each link 94 are offset inwardly of the link from the ends of the bight portion a distance equal to the thickness of the bar from which the link is made. Beyond the central portion 210, an end portion 212 of each leg 97 includes a downward, return bend 214 (FIGS. 6 and 8) of approximately 180°, thereby providing each leg with an elongate hook 216. The hook 216 includes a straight portion 218, hereinafter called the point, which is located between the bend 214 and the terminal end 220 of the associated leg. As shown best in FIG. 6, the point 218 diverges from the bend 214 with respect to the central portion 210. It will be apparent (FIGS. 6 and 7) that the longitudinal axis of the generally cylindrical point 218 and the axis of the cylindrical central portion 210 of each leg 97 define a plane indicated by the broken line 221 (FIG. 7) and extending at a right angle to a plane indicated by the broken line 223 (FIG. 6) and including the axes of the associated bight portion 96 and the central portions 210 of the two legs of each link. The hooks 216 of each link 94 receive in engagement with the bends 214 thereof the bight portion 96 of the adjacent preceding link 94, adjacent the opposite junctures 202, to pivotally interconnect the links. When the links 94 are so connected, the bights 96 extend transversely of the chain 62 and the central portions 210 and the points 218 of the legs 97 are aligned longitudinally of the chain and are adapted to engage the sprockets 106, to maintain lateral alignment of the chains 62.

It is easily possible for the interconnected links of known chains of the present type to slide toward each other and become unhooked if the legs of one link are swung about the axis of their bight portion 96 to approximately any position within an arc of more than 180° relative to the legs of a link connected therewith. For this reason the legs 97 of the links 94 are each provided with an abutment 222 to prevent the links of the chain from becoming unhooked during use.

The abutment 222 of each leg 97 is inclined outward from the free end 208 and away from plane 221 in the plane 223. The outer end 224 of each abutment 222 is located opposite the associated point 218 and is laterally offset from the point 218 and return bend 214. The distance between the ends 224 of the opposite abutments 222 of each link 94 is substantially the same as the width of the links at the opposite junctures 202. Thus, it will be apparent from FIGS. 7 and 8 that, during operation of the harvester 20, if two links 94a, and 94b (FIGS. 6 and 8) of the chain 62 move into the position shown in dot-dash lines (FIG. 6) these links are prevented by the abutments 222a (one shown, FIG. 8) from moving toward each other. Any attempt by these links, when so positioned, to move toward each other and become disconnected is prevented by engagement of one or both straight portions 206 of the link 94b (FIG. 8) with one or both abutments 222 of the link 94a.

It is to be understood that, although the abutments 222 do prevent accidental disconnection of the links 94 while the chain 62 is in use, they do not prevent disconnection of the links 94 when two such interconnected links are pivoted into a position such as that shown in dotted lines (FIG. 6) which is opposite to that shown in the dot-dash lines. When two interconnected links are in the positions of the links shown in dotted lines they can easily be disconnected by moving these links toward each other. The manner of connecting the links 94 is apparent from the foregoing description.

It will be apparent that the trash eliminator 57 of the present invention operates efficiently to separate potatoes from the trash and prevent the build-up of debris on the chute floor 134. Additionally, the configuration of the links 94 assures that the links will remain connected in the chains 62 during harvesting operations.

While a particular embodiment of the present invention has been shown and described it will be understood that the apparatus of the present invention is capable of modification and variation without departing from the principles of the invention and that the scope of the invention should be limited only by the scope and proper interpretation of the claims appended hereto.

The invention having thus been described, what is believed to be new and desired to be protected by Letters Patent is:

1. A potato retarding device comprising a conveyor having transverse flights, said conveyor being adapted to advance potatoes having attached plants carried by said conveyor, potato engaging means having a fixed location beneath said conveyor, potato retarding means movably mounted above said potato engaging means and said conveyor, a spring connected to said potato retarding means and urging the same toward said potato engaging means into resilient engagement with potatoes that are being advanced by said conveyor and are engaging said potato engaging means, adjusting means connected to said spring to vary the effective force thereof and the resulting retarding effect of said potato retarding means during engagement thereof by the potatoes, and an abutment stop engageable by said potato retarding means for limiting movement of said potato retarding means toward said potato engaging means by said spring to a position spaced therefrom to enable the flights of said conveyor to pass between said potato engaging means and said potato retarding means unobstructed by engagement with said potato retarding means.

2. In a potato harvesting apparatus, a conveyor having a series of equally spaced transverse flights for carrying potato plants having potatoes attached, a freely rotatable roller extending across said conveyor, said roller being resiliently mounted adjacent said conveyor in spaced relation above the flights of said conveyor in the path of potatoes advanced by said conveyor for movement toward and away from the same during engagement of said roller by the potatoes, and a hold down flap of flexible material located in spaced relation to said roller at the downstream side thereof, said hold down flap being substantially coextensive with said roller and being draped into engagement with the flights of said conveyor to depress the potato plants after the same have passed beneath the roller.

3. In a potato harvesting apparatus, a conveyor having a discharge end portion and comprising a chain having a plurality of transverse flights spaced apart for passage of potatoes therebetween, a pair of sprockets fixed on a rotatable drive shaft and having driving engagement with the transverse flights of said conveyor, means for driving said rotatable shaft to thereby advance said conveyor chain toward the discharge end of said conveyor, said conveyor being operable to receive potato plants having potatoes attached and to carry the plants and the attached potatoes toward the discharge end of said conveyor, a resiliently mounted roller located adjacent said conveyor and adapted to yieldably engage potatoes thereon and to retard the potatoes as the same are carried by said conveyor into engagement with said resiliently mounted roller, a chute extending downward from above said rotatable shaft at the discharge end of said conveyor in spaced relation between said shaft and said conveyor, said chute extending beneath said conveyor to the discharge end of said chute located remotely from the discharge end of said conveyor, means pivotally mounting said chute adjacent its discharge end for vertical swinging movement, and a cam fixed to said rotatable shaft and engaging the under surface of said chute adjacent the discharge end of said conveyor to oscillate said chute during advance of said conveyor chain to prevent debris from adhering to said chute.

4. In a potato harvesting apparatus, a conveyor having a plurality of transverse flights spaced apart for the passage of potatoes therebetween, said conveyor being operable to receive potato plants having potatoes attached and to carry the plants and attached potatoes toward the discharge end of said conveyor, potato retarding means located adjacent said conveyor remotely from the discharge end thereof and adapted to retard the potatoes relatively to the plants carried by said conveyor to strip the potatoes from the plants, a chute located beneath said conveyor and having a discharge end spaced beneath said potato retarding means, said chute extending upward from its discharge end toward the discharge end of said conveyor to receive the stripped potatoes, means pivotally mounting said chute adjacent its discharge end for vertical swinging movement, and means adjacent the opposite end of the chute for swinging said chute to impart vibratory motion thereto to prevent the adherance of debris, the amplitude of the vibrations imparted to each part of the chute being proportional to the distance said part is from the discharge end of the chute.

References Cited in the file of this patent

UNITED STATES PATENTS

| | | |
|---|---|---|
| 1,059,129 | Edwards et al. | Apr. 15, 1913 |
| 1,184,653 | Lehrer | May 23, 1916 |
| 1,202,737 | Klitzke | Oct. 24, 1916 |
| 2,468,639 | Sample | Apr. 26, 1949 |
| 2,711,742 | Lavers | June 28, 1955 |
| 2,861,686 | Johnson | Nov. 25, 1958 |
| 2,901,048 | Krukowski | Aug. 25, 1959 |
| 2,942,722 | Painter | June 28, 1960 |
| 2,944,660 | Johnston | July 12, 1960 |

FOREIGN PATENTS

| | | |
|---|---|---|
| 388,565 | Germany | Jan. 18, 1924 |